United States Patent [19]
Kagami

[11] Patent Number: 5,050,005
[45] Date of Patent: Sep. 17, 1991

[54] FACSIMILE APPARATUS

[75] Inventor: Naoto Kagami, Yokohama, Japan

[73] Assignee: Canon Kabushiki Kaisha, Tokyo, Japan

[21] Appl. No.: 320,058

[22] Filed: Mar. 7, 1989

[30] Foreign Application Priority Data

Mar. 15, 1988 [JP] Japan .................. 63-59248

[51] Int. Cl.⁵ .............................. H04N 1/32
[52] U.S. Cl. ..................... 358/434; 178/4; 370/110.1
[58] Field of Search ............ 358/434; 128/4; 370/110.1, 94.1

[56] References Cited

U.S. PATENT DOCUMENTS

| | | | |
|---|---|---|---|
| 4,677,257 | 6/1987 | Ogasawara et al. | 178/4 |
| 4,677,492 | 6/1987 | Fellerer | 358/434 |
| 4,722,082 | 1/1988 | Furuya et al. | 370/110.1 |
| 4,746,986 | 5/1988 | Tanigawa | 358/434 |
| 4,792,648 | 12/1988 | Ogasawara et al. | 178/4 |
| 4,800,439 | 1/1989 | Yoshino | 358/434 |
| 4,876,604 | 10/1989 | Nobuta | 358/434 |
| 4,922,348 | 5/1990 | Gillon et al. | 358/434 |
| 4,922,484 | 5/1990 | Yoshida et al. | 370/110.1 |
| 4,958,153 | 9/1990 | Murata et al. | 370/94.1 |

FOREIGN PATENT DOCUMENTS

| | | |
|---|---|---|
| 0170887 | 2/1986 | European Pat. Off. |
| 3515012 | 4/1985 | Fed. Rep. of Germany |
| 61-200763 | 9/1986 | Japan |
| 2160072 | 12/1985 | United Kingdom |

Primary Examiner—Edward L. Coles, Sr.
Attorney, Agent, or Firm—Fitzpatrick, Cella, Harper & Scinto

[57] ABSTRACT

A facsimile apparatus connected on an ISDN side in a communication network in which the ISDN is connected to a telephone network includes network identifying means for identifying whether an incoming data sending party is an ISDN terminal or a telephone network terminal, CNG signal detecting means for detecting a CNG signal received via a B channel, and changeover means for changing over between automatic reception and manual reception. In a case where the CNG signal is detected, a response is made in a facsimile mode. In a case where the CNG signal is not detected, a response is made in a facsimile mode if automatic reception prevails and in a telephone mode if manual reception prevails. This arrangement eliminates communication failure due to a difference in mode between a calling side and a called side regardless of the network terminal from which a call is received.

10 Claims, 3 Drawing Sheets

FACSIMILE APPARATUS

BACKGROUND OF THE INVENTION

1. Field of the Invention

This invention relates to a facsimile apparatus and, more particularly, to a facsimile apparatus connected on the ISDN side in a communication network in which the ISDN is connected to a telephone network.

2. Description of the Prior Art

An ISDN is a communication network which provides a wire variety of services, such as telephone, data and facsimile communication services, wherein information such as voice and image data is communicated in the form of a 64 Kbps digital signal by an information channel referred to as a B channel. Signal-converted information for link control, call control, etc., used in communicating with a network is transferred over a 16 Kbps D channel.

Though a public switched telephone network (PSTN) is presently in wide use as a communication network, there are plans to replace with with the ISDN. In the transitional period during which the replacement will be made, both the ISDN and PSTN will coexist for an extended period of time and the two networks will be connected to each other.

In G3 facsimile modulation/demodulation, a procedure signal employs a CCITT V.21 300 bps modem, a picture signal employs a CCITT v.299 600 bps modem, and the bandwidth used is 300 Hz–3.3 KHz. In mutual communication with a G3 facsimile in a network connection between the ISDN and PSTN, an ISDN facsimile converts the transmission analog signal of both modems into a digital signal by CCITT G.711 u-law or A-law coding and then transmits the analog signal, and converts a received digital signal into an analog signal by the above-mentioned coding. The transmitted and received digital signals are transferred to or from a telephone network through the B channel of the ISDN.

An ISDN bearer service, which is defined by CCITT advisory I.211, is classified into voice, 3.1 KHz audio and 64 KHz unlimited digital. Voice refers to a telephone signal, 3.1 KHz audio to a 3.1 KHz band data signal, such as in a G3 facsimile, and 64 KHz unlimited digital to a digital signal such as in a G4 facsimile. Thus, in an ISDN, the information which flows through the network is recognized as being a telephone voice or facsimile image data.

In an ISDN terminal, a terminating procedure of the kind shown in FIG. 3 is executed. By means of a SET-UP message, the network indicates to a called terminal the classification of the transfer capability, namely the voice signal, 3.1 KHz audio signal or 64 KHz unlimited digital signal. The called terminal checks the abovementioned transfer capability and decides whether a response is allowed.

In the telephone network, on the other hand, an end-to-end bus is connected in accordance with a telephone number requested by the calling terminal, and whether the information which flows through the network is a voice signal or facsimile image signal cannot be identified. Accordingly, in a case where a call is placed from a telephone network to the ISDN in a network connection between the telephone network and the ISDN, it is no longer possible to distinguish between a voice and 3.1 KHz audio. This means that an ISDN facsimile will be incapable of recognizing whether a calling terminal is a telephone or a facsimile.

SUMMARY OF THE INVENTION

Thus, when a call is received from a pay station network or G3 facsimile, the ISDN terminal is unclear as to whether the call is from a telephone or a facsimile. The problem that results is that the called terminal cannot decide whether to respond with a facsimile signal or inform the operator of the fact that a call has been received from a telephone.

The present invention solves this problem encountered in the prior art and it is an object of the invention to provide a facsimile apparatus which eliminates communication failure due to a difference in mode between a calling side and a called side regardless of the network terminal from which a call is received.

Another object of the present invention is to provide a facsimile apparatus connected to an ISDN, comprising first communication means for communicating in G4 facsimile mode, second communication means for communicating in G3 facsimile mode, detecting means for detecting a signal from G3 facsimile received via a B channel, and control means for selecting said second communication means to communicate in G3 facsimile mode according to the signal detected by said detecting means or selecting said first communication means when the signal is not detected.

A further object of the present invention is to provide a facsimile apparatus connected to an ISDN, comprising first communication means for communicating in G4 facsimile mode, second communication means for communicating in G3 facsimile mode, changeover means for changing over between automatic mode to communicate automatically in response to a call received from the ISDN and manual mode to communicate manually in course of manual instructions, detecting means for detecting a signal from G3 facsimile received via a B channel, and control means for selecting said second communication means to communicate in G3 facsimile mode in spite of the mode set by said changeover means, when said signal is detected by said detecting means.

A further object of the present invention is to provide a facsimile apparatus further comprising network identifying means for identifying whether an incoming data sending party is an ISDN terminal or an analogue network terminal.

A further object of the present invention is to provide a facsimile apparatus further comprising telephone means for telephoning to respond to signals received from the ISDN in said manual mode.

A further object of the present invention is to provide a facsimile apparatus connected on an ISDN in a communication network in which the ISDN is connected to a telephone network, comprising network identifying means for identifying whether an incoming data sending party is an ISDN terminal or a telephone network terminal, CNG signal detecting means for detecting a CNG signal received via a B channel, and changeover means for changing over between automatic reception and manual reception.

In a case where the CNG signal is detected in the above arrangement, a response is made in a facsimile mode. In a case where the CNG signal is not detected, a response is made in a facsimile mode if automatic reception prevails and in a telephone mode if manual reception prevails.

In accordance with the invention, there can be provided a facsimile apparatus which eliminates communication failure due to a difference in mode between a calling side and a called side regardless of the network terminal from which a call is received.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
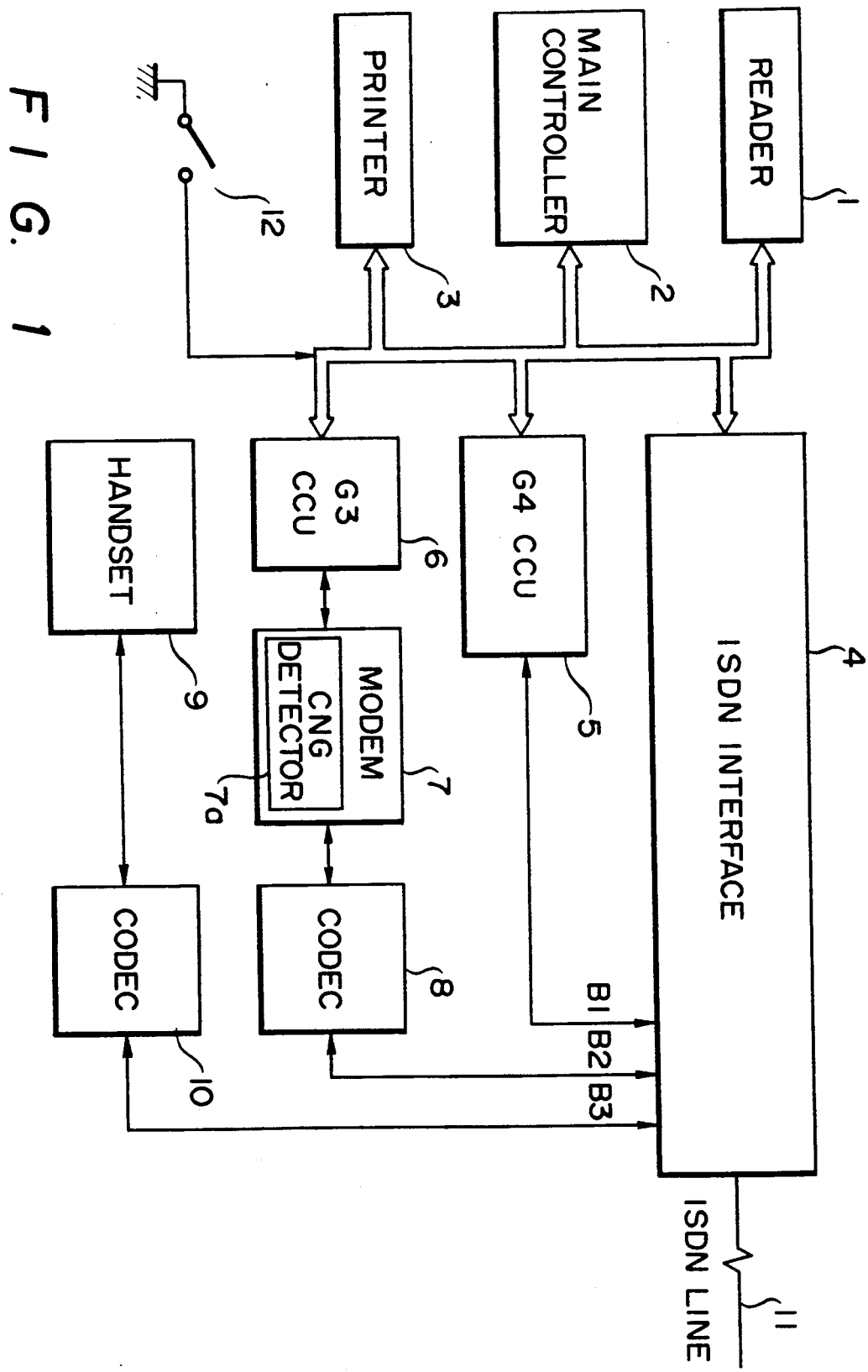
FIG. 1 is an embodiment of a block diagram illustrating a facsimile apparatus according to the present invention.

FIG. 1 is an embodiment of a block diagram illustrating a facsimile apparatus according to the present invention. The facsimile apparatus includes a reader 1 for reading an original manuscript, a main controller 2 for administering overall control of the apparatus, a printer 3 for performing printing, an ISDN interface 4 for controlling transmission and reception with regard to an ISDN, a G4 CCU 5 for implementing B-channel protocol of a G4 facsimile, a G3 CCU 6 for implementing T.30 protocol of a G3 facsimile, and a modem 7 for modulating/demodulating a T.30 protocol signal and a G3 picture signal, the modem having a CNG detector 7a for detecting a CNG signal. The apparatus further includes a G.711 codec 8 for analog signal and digital signal conversion, a telephone handset 9, a G.711 codec 10 for voice signal and digital signal conversion, an ISDN line 11, and an automatic reception switch 12.

Operation of this arrangement at the time of a transmission will now be described. Image data read by the reader 1 is transferred to the G4 CCU 5 if the G4 mode is in effect and to the G3 CCU 6 if the G3 mode is in effect. The G4 CCU 5 transfers the image data to the ISDN interface 4 as a B-channel signal $B_1$ with a B-channel protocol. The G3 CCU 6 attaches a G3 facsimile protocol T.30 to the image data, which is modulated by the modem 7 and converted into a PCM signal by the codec 8. This signal is transferred to the ISDN interface 4 as a B-channel signal $B_2$. The handset 9 converts a voice into an electric signal, which is transferred to the ISDN interface 4 as a B-channel signal $B_3$ by the codec 10.

The ISDN interface 4 executes procedures in accordance with an ISDN D-channel protocol layer 1 (CCITT advisory I.430), layer 2 (CCITT advisory I.441), layer 3 (CCITT advisory I.451) and B-channel protocol layer 1 (CCITT advisory I.430). The D-channel protocol layer 1 and B-channel protocol layer 1 are a physical electrical stipulation and channel multiplexing stipulation. The D-channel protocol layer 2 is a link control procedure stipulation for network linkage. The D-channel protocol layer 3 is a call control procedure stipulation for connection with the communicating party.

The ISDN interface 4 is such that a connection is made with the communicating party by the D-channel protocol, after which the information from the G4 CCU 5, G3 CCU 6 or handset 9 is transmitted from the ISDN line 11 via the B channel.

Operation when a call is received will now be described. A signal received from the ISDN line 11 is separated into a D channel and B channel by the ISDN interface 4. The B-channel information is converted into an analog signal by the G4 CCU 5 or codec 8. The analog signal from the coded 8 is transferred to the G3 CCU 6 via the modem 7 and CNG detector 7a. Alternatively, the B-channel information is converted into an analog signal by the codec 10 and then transferred to the handset 9. Picture signals from the G4 CCU 5 and G3 CCU 6 are printed out by the printer 3 under the control of the main controller 2.

Figure 2:
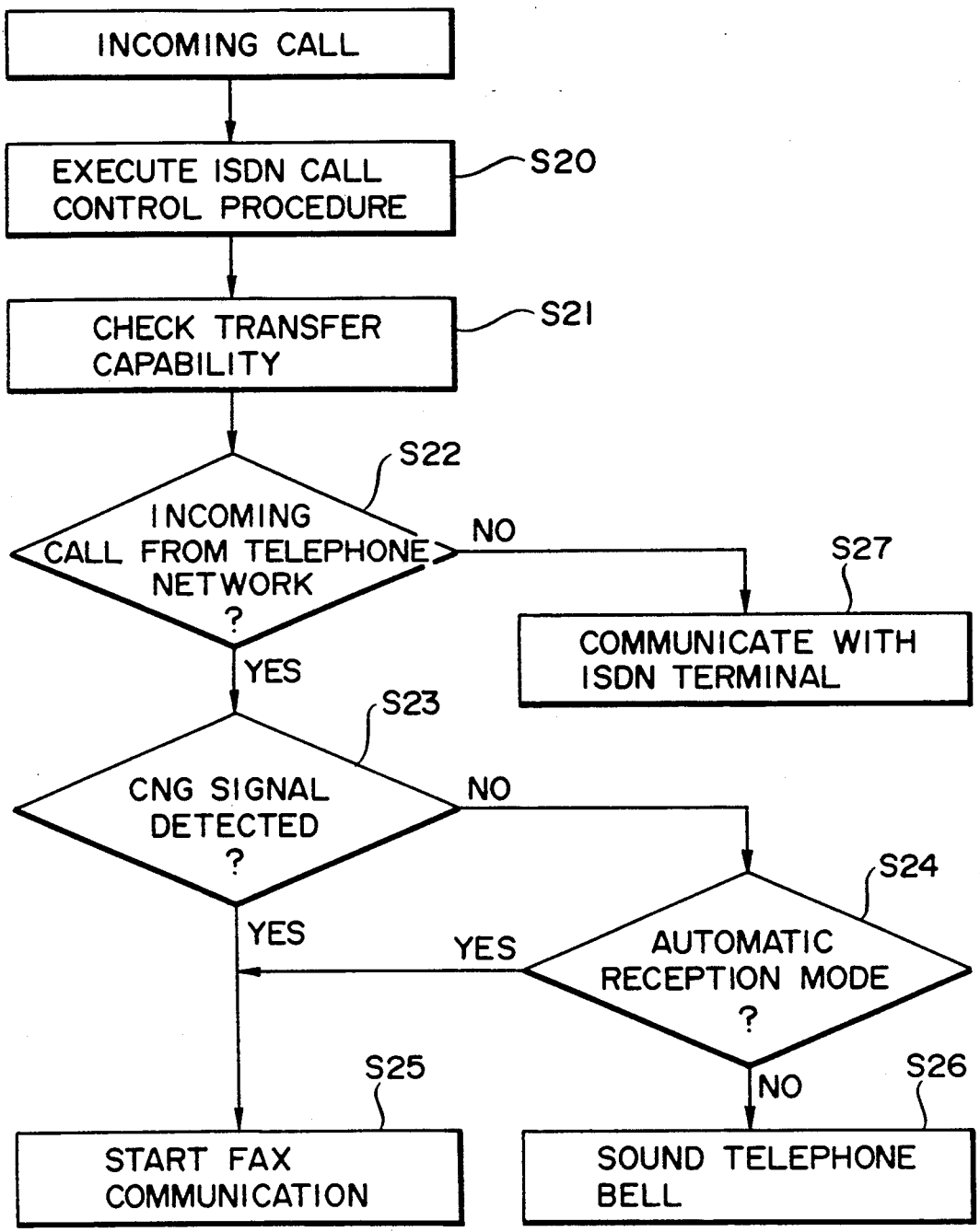
FIG. 2 is a flowchart illustrating the terminating operation of the embodiment of the facsimile apparatus.

FIG. 2 is a flowchart of a terminating operation in the facsimile apparatus of the present embodiment.

Figure 3:
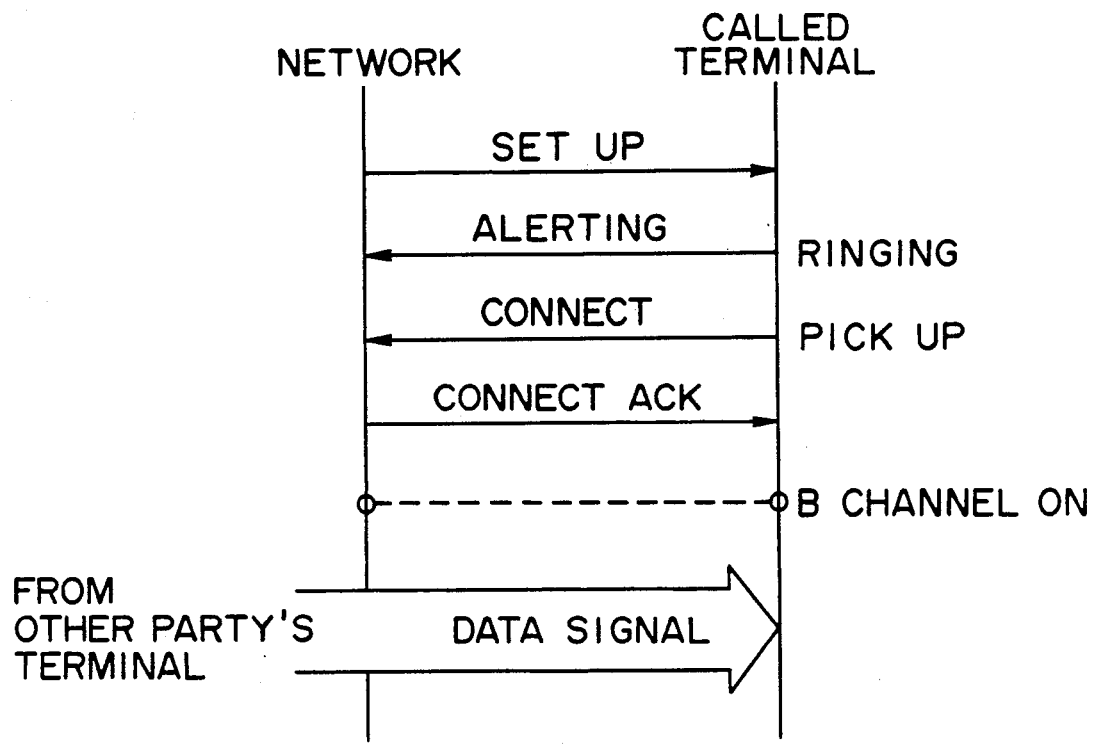
FIG. 3 is a view illustrating an ISDN terminating procedure.

When a call is received from a network at step S20 of the flowchart, the ISDN call control procedure is executed by the ISDN interface 4 of FIG. 1. This is followed by a step S21, at which a voice, 3.1 KHz audio or 64 KHz unlimited digital is recognized by a transfer capability information element in the SET-UP message of FIG. 3. Whether the call has been received from a telephone network is identified by an interim identifier information element in the abovementioned SET-UP message. The operations of both steps S21 and S22 are executed by the ISDN interface 4 of FIG. 1.

When a call is not received from the telephone network, the program proceeds to step S27, at which the apparatus communicates with an ISDN terminal. When a call is received from the telephone network, CNG signal detection is performed by the CNG detector 7a (FIG. 1) at step S23. The G3 CCU 6 and the main controller 2 are informed of the results of detection. The CNG signal will now be described.

Figure 4:
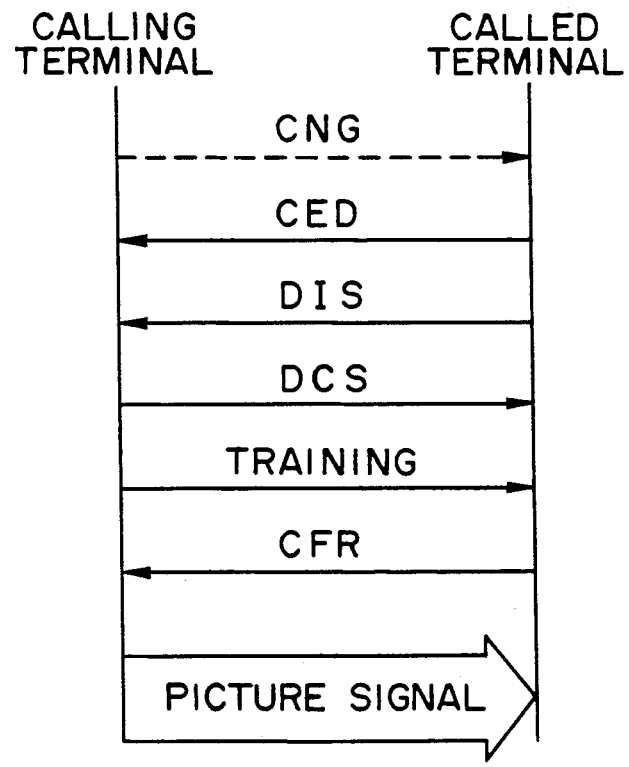
FIG. 4 is a view illustrating a G3 facsimile communication procedure.

CCITT advisory T.30 stipulates the protocols of the telephone network G2, G3 facsimiles. The communication procedure of the G3 facsimile is illustrated in FIG. 4. In accordance with the CCITT advisory T.30, the CNG signal is defined as follows:

(1) The calling office of a non-voice frequency terminal first transmits the CNG signal.

(2) The signal is essential with an automatic calling terminal and optional with a manual terminal.

(3) The signal is sinusoidal with a frequency of 1100±38 Hz.

(4) The signal is on for 0.5 sec and off for 3 sec.

Detection of the CNG signal at step S23 is performed in the following manner, by way of example:

<Detection of 1100 Hz Sinusoidal Wave>

There are two methods of detecting the frequency of 1100 Hz, which is condition (3) mentioned above. The first entails comparing the analog waveform of the input signal with a reference potential by means of a comparator, differentiating the output of the comparator by a differentiating circuit, and detecting frequency by counting intervals between differentiated pulses at times that the input signal crosses the reference potential. The other method is to detect the 1100 Hz frequency by a PLL circuit.

<Detection of Signal Width>

The on time of 0.5 sec and off time of 3 sec, namely the condition (4) mentioned above, are detected. One method of accomplishing this in a case where the frequency is detected based on the aforementioned differentiating pulses is to measure the time during which the differentiated pulses are inputted within a predetermined interval. Another method in a case where the PLL circuit is used is to measure the length of time of the output waveform. In the foregoing, the on time of 0.5 sec is detected, but the subsequent off time of 3 sec can be detected in a similar manner.

Though the conditions for detecting CNG are the two conditions (3), (4) mentioned above, in actuality it is sufficient to rely solely upon detection based on the frequency of condition (3). If the CNG signal has been detected, the program proceeds to step S25, where the communicating part is judged to be a G3 facsimile and communication is performed in accordance with the G3 communication procedure of FIG. 4.

If the CNG signal has not been detected, the program proceeds to step S24, where it is determined by the main controller 2 of FIG. 1 whether the automatic reception switch 12 is in the ON state. If the automatic mode is in effect, the program proceeds to the step S25; if not, the program proceeds to step S26, at which the operator is informed of the fact that a telephone call has arrived.

In the present embodiment, the facsimile connected to the telephone network is a G3 facsimile. However, the facsimile of the telephone network can be a G1 or G2 facsimile. The reason is that these facsimiles also transmit a CNG signal just as the G3 facsimile does. In addition, the discrimination of the incoming data by detection of the CNG signal in the present embodiment is effective even in communication between G3 facsimiles. Furthermore, the CNG detector is provided in the modem in order to simplify the circuitry. However, the invention is not limited to such an arrangement.

Thus, as set forth hereinabove, CNG signal detection is performed when a call is received from a telephone network. If the CNG signal is detected, a decision is rendered to the effect that the communication party is a telephone network facsimile. This is effective in reducing communication failure due to non-agreement between telephone and facsimile communication modes.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus connected to an ISDN, comprising:
   first communication means for communication with G4 facsimile apparatus via the ISDN in G4 facsimile mode;
   second communication means for communicating with G3 facsimile apparatus via the ISDN in G3 facsimile mode;
   detecting means for detecting whether or not a signal received via a B channel comes from G3 facsimile apparatus; and
   control means for selecting either said first communication mean or said second communication means according to the detection by said detecting means.

2. The facsimile apparatus according to claim 1, wherein said detecting means detects whether or not the signal comes from G3 facsimile apparatus on basis of a CNG signal.

3. The facsimile apparatus according to claim 1, further comprising changeover means for changing over between automatic mode to communicate automatically in response to a call received from the ISDN and manual mode to communicate manually in course of manual instructions,
   wherein said control means selects said second communication means in spite of whether the mode is said automatic mode or said manual mode, whenever said detecting means detects that the signal comes from G3 facsimile apparatus.

4. A facsimile apparatus connected to an ISDN, comprising:
   first communication means for communicating with G4 facsimile apparatus via the ISDN in G4 facsimile mode;
   second communication means for communicating with G3 facsimile apparatus via the ISDN in G3 facsimile mode;
   changeover means for changing over between an automatic mode to communicate automatically in response to a call received from the ISDN and a manual mode to communicate manually in course of manual instructions;
   detecting means for detecting whether or not a signal received via a B channel comes from G3 facsimile apparatus; and
   control means for selecting said second communication means to communicate in G3 facsimile mode in spite of the mode set by said changeover means, when it is detected by said detecting means that said signal comes from G3 facsimile apparatus.

5. The facsimile apparatus according to claim 4, wherein said detecting means detects whether or not the signal comes from G3 facsimile apparatus on basis of a CNG signal.

6. The facsimile apparatus according to claim 4, further comprising network identifying means for identifying whether an incoming data sending party is an ISDN terminal or an analogue network terminal, said control means selecting said first communication means when it is identified by said network identifying means that an incoming data sending party is an ISDN terminal.

7. The facsimile apparatus according to claim 1, further comprising network identifying means for identifying whether an incoming data sending party is an ISDN terminal or an analogue network terminal, said control means for selecting said first communication means when it is identified by said network identifying means that an incoming data sending party is an ISDN terminal.

8. The facsimile apparatus according to claim 3, further comprising telephone means for telephoning to respond to signals received from the ISDN in said manual mode.

9. The facsimile apparatus according to claim 4, further comprising telephone means for telephoning to respond to signals received from the ISDN in said manual mode.

10. A facsimile apparatus connected on an ISDN in a communication network in which the ISDN is connected to a telephone network, comprising:
    network identifying means for identifying whether an incoming data sending party is an ISDN terminal or a telephone network terminal on basis of a signal via a D channel;
    CNG signal detecting means for detecting a CNG signal from a signal received via a B channel in order to decide whether or not the incoming data sending party is a G3 facsimile apparatus; and changeover means for changing over between automatic reception and manual reception;

when it is identified by said network identifying means that the incoming data sending party is a telephone network terminal, response being made in a facsimile mode in a case where said CNG signal is detected, in the facsimile mode if automatic reception is in effect in a case where said CNG signal is not detected, and in a telephone mode if manual reception is in effect in a case where said CNG signal is not detected.

* * * * *

UNITED STATES PATENT AND TRADEMARK OFFICE
CERTIFICATE OF CORRECTION

PATENT NO. : 5,050,005
DATED : September 17, 1991
INVENTOR(S) : NAOTO KAGAMI

It is certified that error appears in the above-identified patent and that said Letters Patent is hereby corrected as shown below:

Title page,

IN [56] REFERENCES CITED

Under FOREIGN PATENT DOCUMENTS,
"3515012  4/1985  Fed. Rep. of Germany ." should read
--3515012  10/1985  Fed. Rep. of Germany .--.

COLUMN 1

Line 23, "replace with" should read --replace this--.

COLUMN 4

Line 11, "coded 8" should read --codec 8--.

COLUMN 5

Line 61, "mean" should read --means--.
Line 65, "on basis" should read --on the basis--.

COLUMN 6

Line 33, "on basis" should read --on the basis--.

UNITED STATES PATENT AND TRADEMARK OFFICE
CERTIFICATE OF CORRECTION

PATENT NO. : 5,050,005
DATED : September 17, 1991
INVENTOR(S) : NAOTO KAGAMI

It is certified that error appears in the above-identified patent and that said Letters Patent is hereby corrected as shown below:

COLUMN 6

Line 63, "on basis" should read --on the basis--.

Signed and Sealed this

Twenty-fourth Day of August, 1993

Attest:

BRUCE LEHMAN

*Attesting Officer*       *Commissioner of Patents and Trademarks*